United States Patent
Song (10) Patent No.: US 10,759,414 B2
(45) Date of Patent: Sep. 1, 2020

(54) DRIVING CONTROL METHOD FOR HYBRID VEHICLE

(71) Applicants: Hyundai Motor Company, Seoul (KR); Kia Motors Corporation, Seoul (KR)

(72) Inventor: Min Seok Song, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 16/004,609

(22) Filed: Jun. 11, 2018

(65) Prior Publication Data

US 2019/0168742 A1 Jun. 6, 2019

(30) Foreign Application Priority Data

Dec. 5, 2017 (KR) .................. 10-2017-0166111

(51) Int. Cl.
*B60W 20/40* (2016.01)
*B60W 10/06* (2006.01)

(52) U.S. Cl.
CPC ............ *B60W 20/40* (2013.01); *B60W 10/06* (2013.01); *B60W 2510/244* (2013.01); *B60W 2520/105* (2013.01); *Y10S 903/905* (2013.01)

(58) Field of Classification Search
CPC ................. B60W 20/40; B60W 10/06; B60W 2510/244; B60W 2520/105; B60W 20/20; B60W 10/08; B60W 50/0098; B60W 2520/10; B60W 2552/05; B60W 2050/0088; B60W 2050/0089; B60W 2540/30; B60W 2556/50; Y10S 903/905
USPC ......................................................... 701/22
See application file for complete search history.

(56) References Cited

FOREIGN PATENT DOCUMENTS

KR 20150001984 A 1/2015

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

A driving control method for a hybrid vehicle is capable of improving fuel efficiency of the hybrid vehicle and increasing acceleration/deceleration responsiveness of the vehicle according to a demand of a driver by more appropriately selecting a point of time at which an engine is turned on/off in the hybrid vehicle in response to a driving situation, and controlling driving of the engine and a motor accordingly.

7 Claims, 5 Drawing Sheets

DRIVING CONTROL METHOD FOR HYBRID VEHICLE

CROSS REFERENCE TO RELATED APPLICATION

This application claims under 35 U.S.C. § 119(a) the benefit of Korean Patent Application No. 10-2017-0166111 filed on Dec. 5, 2017, the entire contents of which are incorporated by reference herein.

BACKGROUND

1. Technical Field

The present disclosure relates to a driving control method for a hybrid vehicle, more particularly, to a control method for turning on/off an engine of a hybrid vehicle.

2. Description of the Related Art

A hybrid electric vehicle includes a configuration having an engine and a motor, as two power sources for driving a vehicle.

The overall energy consumption of the hybrid vehicle is varied depending on how the two power sources are driven with respect to a required power of the vehicle. Therefore, driving of the two power sources directly affects fuel efficiency of the vehicle.

In general, in the hybrid electric vehicle as described above, when the vehicle starts or the required power of a driver is low, driving power of the vehicle is secured only by the motor without turning on the engine, and when the required power is high, the engine is turned on to supplement the driving power.

Conventionally, a turn on/off control of the engine according to the required power prevents an excessively frequent turn on/off of the engine by using hysteresis in which an engine-on reference value is set above a power at an optimal efficiency operating reference point and an engine-off reference value is set below the power at the optimal efficiency operating reference point such that the engine is turned on when the required power of the driver is increased and reaches the engine-on reference value and the engine is turned off when the required power of the driver is decreased and reaches the engine-off reference value.

However, since the use of hysteresis as described above causes a start-on of the engine to be delayed as compared to the optimal efficiency operating reference point of the engine, and also causes a start-off of the engine to be delayed after the optimal efficiency operating reference point, the time in which the engine is driven in an inefficient region is increased and acceleration/deceleration responsiveness of the vehicle is deteriorated.

The contents described as the related art have been provided only for assisting in the understanding for the background of the present disclosure and should not be considered as corresponding to the related art known to those skilled in the art.

SUMMARY

The present disclosure provides a driving control method for a hybrid vehicle capable of improving fuel efficiency of the hybrid vehicle and increasing acceleration/deceleration responsiveness of the vehicle according to a demand of a driver by more appropriately selecting a point of time at which an engine is turned on/off in the hybrid vehicle in response to a driving situation of the vehicle, and controlling a driving of the engine and a motor accordingly.

According to an exemplary embodiment of the present disclosure, there is provided a driving control method for a hybrid vehicle including: an expected velocity calculation step of calculating, by a controller, an expected velocity of a corresponding vehicle based on a driver average vehicle velocity, which is an average vehicle velocity of a vehicle which is being driven and a road average vehicle velocity, which is an average vehicle velocity of a road on which the vehicle is being driven; a driving situation determination step of determining, by the controller, whether or not the vehicle is in a transition driving situation or a steady driving situation based on a current velocity of the vehicle and the expected velocity; a reference value correction step of correcting, by the controller, a basic engine-on reference value which is set to turn on an engine and a basic engine-off reference value which is set to turn off the engine according to required power of a driver to a corrected engine-on reference value and a corrected engine-off reference value in consideration of the expected velocity and the current velocity, respectively, when it is determined that the vehicle is in the steady driving situation as a result of performing the driving situation determination step; and an engine-on/off step of turning on, by the controller, the engine when the required power of the driver is increased and reaches the corrected engine-on reference value during driving of the vehicle and turning off, by the controller, the engine when the required power of the driver is decreased and reaches the corrected engine-off reference value during the driving of the vehicle.

In the expected velocity calculation step, the driver average vehicle velocity may be calculated by dividing a value obtained by adding vehicle velocities in all steps before a predetermined reference step number from a current control step of the controller by the reference step number; the road average vehicle velocity, which is average vehicle velocity of the road on which the vehicle is being driven, may be obtained from a navigation of the corresponding vehicle; and the expected velocity may be calculated by adding a value obtained by multiplying a first correction factor with a difference between the road average vehicle velocity and the driver average vehicle velocity to the driver average vehicle velocity.

In the driving situation determination step, when a state in which a difference between the expected velocity and the current velocity is a predetermined reference vehicle velocity or less is maintained for a predetermined maintenance time or more, it may be determined that the corresponding vehicle is in the steady driving situation, and otherwise, it is determined that the vehicle is in the transition driving situation.

In the reference value correction step, the basic engine-on reference value may be determined from a map according to the current velocity of the corresponding vehicle and a state of charge (SOC) of a battery, and the corrected engine-on reference value may be determined by the equation:

Corrected Engine-On Reference Value=Basic Engine-On Reference Value−(Expected Velocity−Current Velocity)*FactorON, where FactorON=MIN[Current SOC−Reference SOC], Upper Limit SOC] *Current Velocity*MAX[(Expected Velocity−Current Velocity), 0] *GainON.

In the reference value correction step, the basic engine-off reference value may be determined from a map according to the current velocity of the corresponding vehicle and a state of charge (SOC) of a battery, and the corrected engine-off reference value may be determined by the equation:

Corrected Engine-Off Reference Value=Basic Engine-Off Reference Value+(Current Velocity−Expected Velocity)*FactorOFF, where FactorOFF=MIN[Current SOC−Reference SOC], Upper Limit SOC]*Current Velocity*MAX[(Current Velocity−Expected Velocity), 0] *GainOFF.

In the reference value correction step, when the expected velocity is greater than the current velocity, the basic engine-on reference value may be corrected to the corrected engine-on reference value.

In the reference value correction step, when the current velocity is greater than the expected velocity, the basic engine-off reference value may be corrected to the corrected engine-off reference value.

A non-transitory computer readable medium containing program instructions executed by a processor includes: program instructions that calculate an expected velocity of a corresponding vehicle based on a driver average vehicle velocity, which is an average vehicle velocity of a vehicle which is being driven and a road average vehicle velocity, which is an average vehicle velocity of a road on which the vehicle is being driven; program instructions that determine whether or not the vehicle is in a transition driving situation or a steady driving situation based on a current velocity of the vehicle and the expected velocity; program instructions that correct a basic engine-on reference value which is set to turn on an engine and a basic engine-off reference value which is set to turn off the engine according to a required power of a driver to a corrected engine-on reference value and a corrected engine-off reference value in consideration of the expected velocity and the current velocity, respectively, when it is determined that the vehicle is in the steady driving situation as a result of performing the driving situation determination step; and program instructions that turn on the engine when the required power of the driver is increased and reaches the corrected engine-on reference value during driving of the vehicle and turn off the engine when the required power of the driver is decreased and reaches the corrected engine-off reference value during the driving of the vehicle.

DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 6:
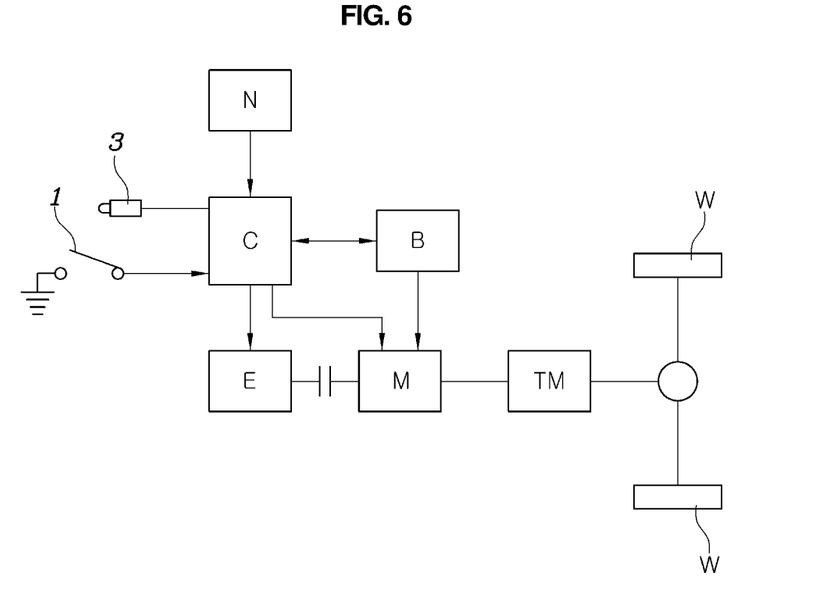
FIG. 6 is a configuration example of a hybrid vehicle to which the present disclosure may be applied.

FIG. 6 illustrates a configuration of a hybrid vehicle to which the present disclosure may be applied, wherein an engine E is connected to a motor M by an engine clutch EC, the motor M is connected to a transmission TM, and power which is led from the transmission TM is provided to a driving wheel W.

The motor M is connected to a battery B so as to be chargeable and dischargeable, and a controller C may control the engine E and the motor M by receiving SOC information of the battery B, road average vehicle velocity information of a navigation N, and information from an accelerator pedal 1 and a vehicle velocity sensor 3.

Figure 1:
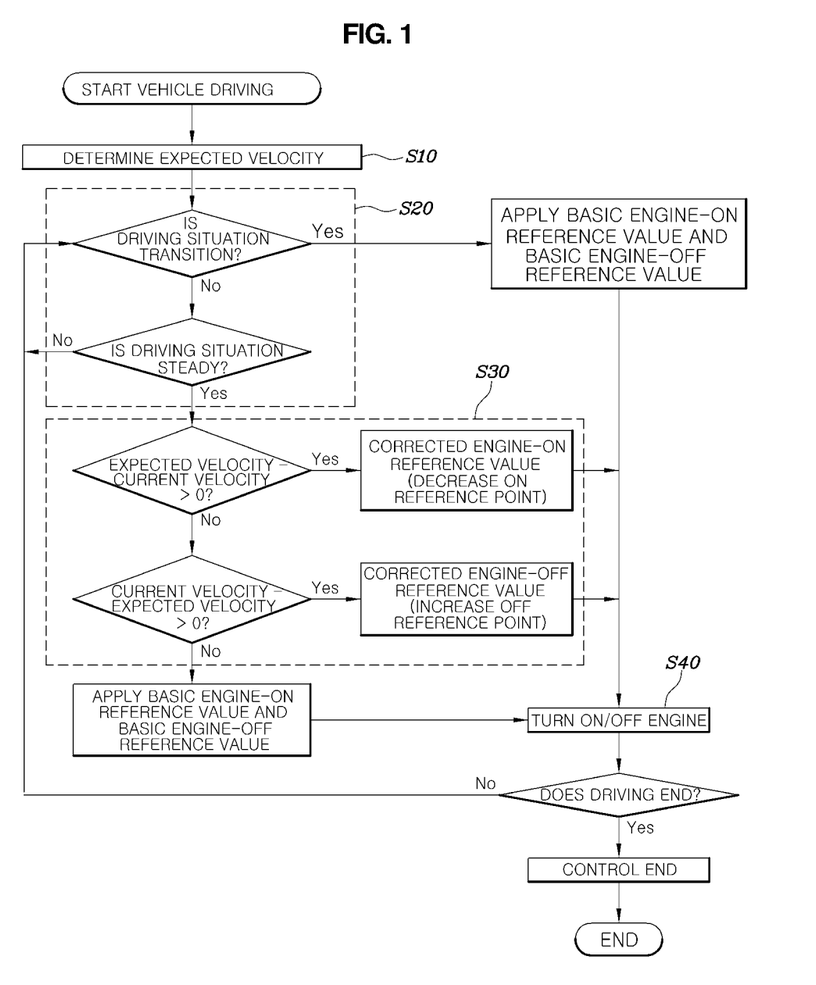
FIG. 1 is a flowchart illustrating an example of a driving control method for a hybrid vehicle according to the present disclosure.

Referring to FIG. 1, a driving control method for a hybrid vehicle according to the present disclosure includes an expected velocity calculation step (S10) of calculating, by a controller C, an expected velocity of a corresponding vehicle based on a driver average vehicle velocity, which is an average vehicle velocity of a vehicle which is being driven and a road average vehicle velocity, which is an average vehicle velocity of a road on which the vehicle is being driven; a driving situation determination step (S20) of determining, by the controller C, whether or not the vehicle is in a transition driving situation or a steady driving situation based on current velocity of the vehicle and the expected velocity; a reference value correction step (S30) of correcting, by the controller C, a basic engine-on reference value which is set to turn on an engine and a basic engine-off reference value which is set to turn off the engine according to required power of a driver to a corrected engine-on reference value and a corrected engine-off reference value in consideration of the expected velocity and the current velocity, when it is determined that the vehicle is in the steady driving situation as a result of performing the driving situation determination step (S20); and an engine-on/off step (S40) of turning on, by the controller C, the engine when the required power of the driver is increased and reaches the corrected engine-on reference value during driving of the vehicle and turning off, by the controller C, the engine when the required power of the driver is decreased and reaches the corrected engine-off reference value during the driving of the vehicle.

That is, according to the present disclosure, the expected velocity indicating how the vehicle will soon behave is calculated by comparing the driver average vehicle velocity, which is the average vehicle velocity of a current point of time of the vehicle by the driving of the corresponding driver with the average vehicle velocity of a road on which the vehicle is being driven, a basic engine-on reference value and a basic engine-off reference value are corrected to a corrected engine-on reference value and a corrected engine-off reference value according to the expected velocity and the current velocity, when it is determined that a difference between the expected velocity and the current velocity is maintained above a predetermined level and a driving situation of the vehicle is in a steady driving situation, and the engine is then turned on or off according to the corrected referenced values, such that a point of time at which the engine is turned on/off is more appropriately adjusted based on relatively reliable real-time behavior prediction of the vehicle, thereby making it possible to improve fuel efficiency of a hybrid vehicle and also increase acceleration and deceleration responsiveness of the vehicle according to a demand of the driver.

In the expected velocity calculation step (S10), the driver average vehicle velocity is calculated by dividing a value obtained by adding vehicle velocities in all steps before a predetermined reference step number from a current control step of the controller C by the reference step number; the mad average vehicle velocity, which is the average vehicle velocity of the road on which the vehicle is being driven, is obtained from a navigation N of the corresponding vehicle; and the expected velocity is calculated by adding a value obtained by multiplying a first correction factor by a difference between the road average vehicle velocity and the driver average vehicle velocity to the driver average vehicle velocity.

That is, the driver average vehicle velocity means the average vehicle velocity near a current point of time at which the vehicle is driven by the driver, and for example, when the current control step of the controller C is N and the reference step number is 10, it is calculated as Driver Average Vehicle Velocity=SUM[V(N), V(N−1), V(N−2), . . . , V(N−9)]/10.

The road average vehicle velocity may be obtained using the average velocity information of a corresponding road that the navigation N receives from a traffic control server about a current road recognized by the navigation N.

The expected velocity is calculated by the equation: Expected Velocity=Driver Average Vehicle Velocity+(Road Average Vehicle Velocity−Driver Average Vehicle Velocity) *First Correction Factor, and is then used as an index for predicting a change of whether the vehicle will accelerate or decelerate. In particular, the first correction factor determines how much the difference between the road average vehicle velocity and the driver average vehicle velocity will be reflected in the expected velocity calculation, where the first correction factor may be 1 or may be set to a different value as needed.

In the driving situation determination step (S20), if a state in which the difference between the expected velocity and the current velocity is a predetermined reference vehicle velocity or less is maintained for a predetermined maintenance time or more, it is determined that the corresponding vehicle is in the steady driving situation, and otherwise, it is determined that the vehicle is in the transition driving situation.

Figure 2:
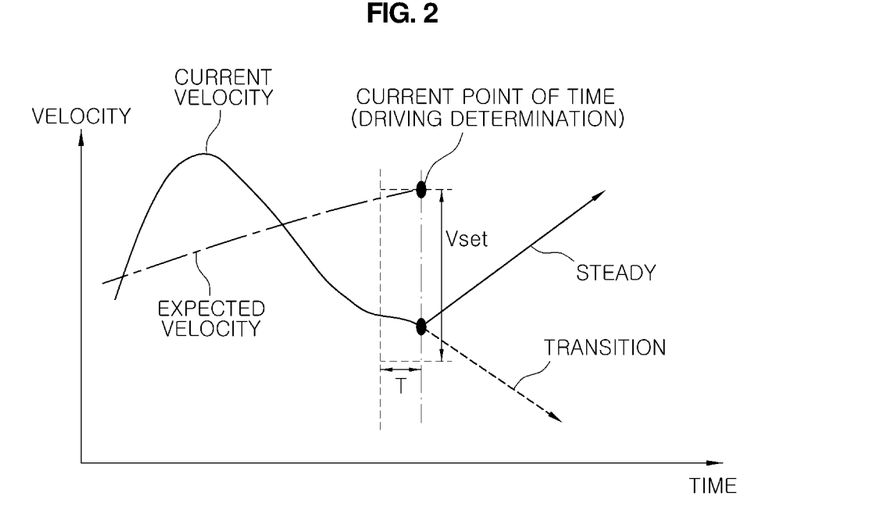
FIG. 2 is a graph illustrating a driving situation determination step according to the present disclosure.

For example, when current velocity and the expected velocity of the vehicle are changed as in the graph according to a change of time as illustrated in FIG. 2, a time in which the difference between the expected velocity and the current velocity is maintained in the range which is smaller than the reference vehicle velocity Vset is maintained for the maintenance time T or more, it is determined that the vehicle is in the steady driving situation, and FIG. 2 illustrates that it is determined that the vehicle is in a 'steady' state, which is the steady driving situation when the current velocity of the vehicle is moved in a direction of a solid line arrow, and it is determined that the vehicle is not in the steady state and is in a 'transition' state in which the vehicle is transitioned to another state when the current velocity of the vehicle shows a behavior which is out of the Vset as in a dotted line arrow.

Figure 3:
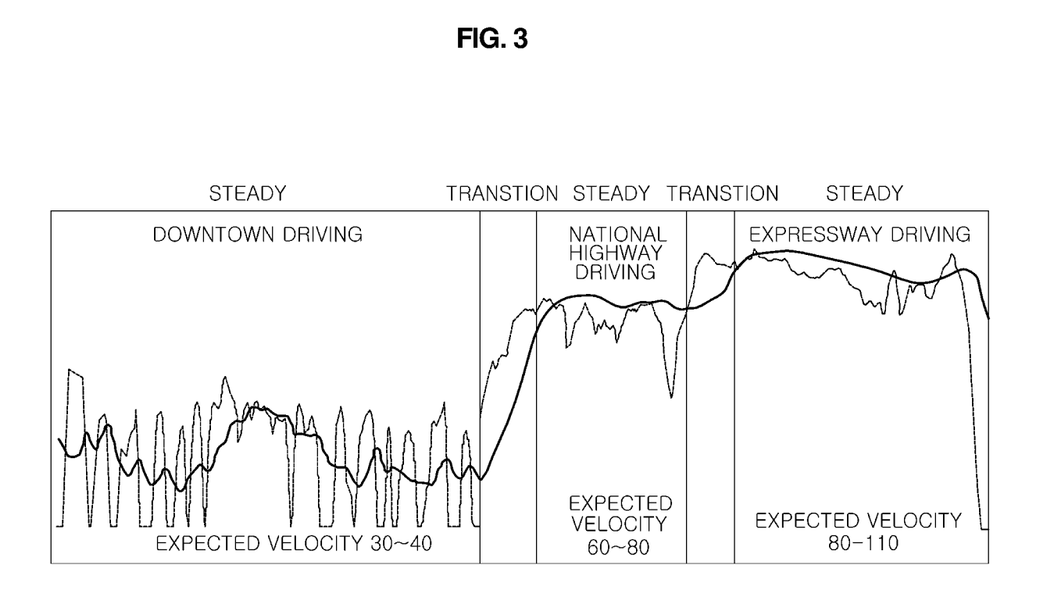
FIG. 3 is a view illustrating results obtained by applying the driving situation determination step according to cases in which the vehicle drives in a downtown or city, a state or national highway, and an interstate highway or expressway.

For reference, FIG. 3 illustrates an example in which the steady state and the transition state are classified by applying the method for determining the driving situation as described above to cases in which the vehicle sequentially performs a downtown or city driving, a state or national highway driving, and an interstate highway or expressway driving.

Figure 4:
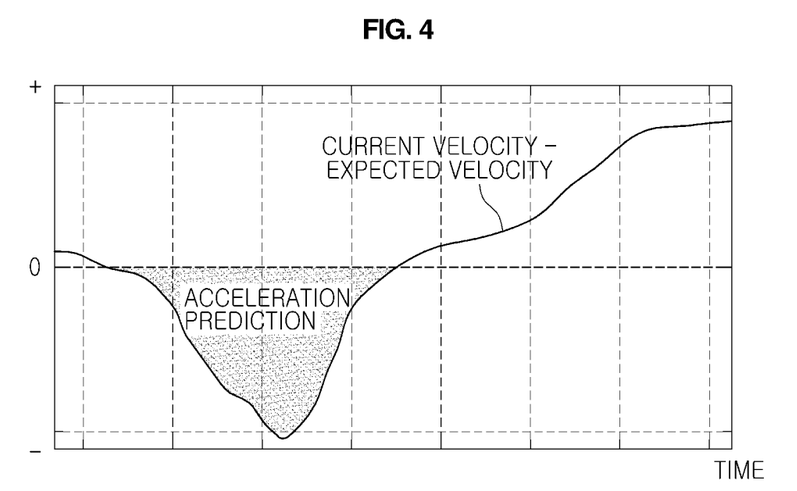
FIG. 4 is a graph illustrating a prediction of acceleration of the vehicle by current velocity and expected velocity according to the present disclosure.

Meanwhile, FIG. 4 describes that acceleration of the vehicle may be predicted using the current velocity of the vehicle and the expected velocity, and for example, it is illustrated that it may be determined that a situation in which the acceleration of the vehicle is predicted in a situation in which a value of current velocity of the vehicle minus (−) expected velocity is a negative number as illustrated in FIG. 4.

In the reference value correction step (S30), the basic engine-on reference value is determined from a map according to the current velocity of the corresponding vehicle and a state of charge (SOC) of the battery.

That is, the controller C obtains the basic engine-on reference value from the map, the map selects and uses the basic engine-on reference value corresponding to a current SOC and the vehicle velocity among basic engine-on reference values which are previously stored according to the SOC of the battery and the vehicle velocity, and the map as described above may be implemented by storing data which is previously determined by a plurality of experiments and interpretations in a memory.

In the reference value correction step (S30) of FIG. 1, it is illustrated that when the expected velocity is greater than the current velocity, the basic engine-on reference value is corrected to the corrected engine-on reference value, when the current velocity is greater than the expected velocity, the basic engine-off reference value is corrected to the corrected engine-off reference value, and when the current velocity and the expected velocity are equal to each other, the conventional basic engine-on reference value and basic engine-off reference value are used as it is without being corrected.

The corrected engine-on reference value is determined by the equation:

Corrected Engine-On Reference Value=Basic Engine-On Reference Value−(Expected Velocity−Current Velocity)*FactorON, where FactorON=MIN[Current SOC−Reference SOC], Upper Limit SOC] *Current Velocity*MAX[(Expected Velocity−Current Velocity), 0] *GainON.

That is, the equation for calculating the corrected engine-on reference value means that the basic engine-on reference value is corrected to be decreased in consideration of the difference between the expected velocity and the current velocity, a degree of considering the difference between the expected velocity and the current velocity is adjusted by the FactorON, the FactorON is determined in consideration of the SOC and the vehicle velocity, the SOC considers a difference between a current SOC and a reference SOC, but does not consider an upper limit SOC or more of the battery, and the vehicle velocity considers a value obtained by subtracting the current velocity from the expected velocity, but does not reflect a situation in which it becomes a negative number which is less than 0.

In particular, the GainON may be for example, 1, or may be set to an appropriate value according to different interpretation or experimentation.

For reference, the reference SOC, which is a basic SOC which is set for the battery mounted in the corresponding hybrid vehicle, means a basic SOC which is set to always follow during a charge and discharge management of the battery, and the upper limit SOC means a basic SOC which is set to prevent the corresponding battery from being over-charged to prevent the battery from being additionally charged.

In the reference value correction step (S30), the basic engine-off reference value is determined from a map according to the current velocity of the corresponding vehicle and a state of charge (SOC) of the battery similarly to the basic engine-on reference value.

The corrected engine-off reference value is determined by the equation:

Corrected Engine-Off Reference Value=Basic Engine-Off Reference Value+(Current Velocity−Expected Velocity)*FactorOFF, where FactorOFF=MIN[Current SOC−Reference SOC], Upper Limit SOC] *Current Velocity*MAX [(Current Velocity−Expected Velocity), 0] *GainOFF.

That is, the equation for calculating the corrected engine-off reference value means that the basic engine-off reference value is corrected to be increased in consideration of the difference between the current velocity and the expected velocity, a degree of considering the difference between the current velocity and the expected velocity is adjusted by the FactorOFF, the FactorOFF is determined in consideration of the SOC and the vehicle velocity, the SOC considers a difference between a current SOC and a reference SOC, but does not consider an upper limit SOC or more of the battery, and the vehicle velocity considers a value obtained by subtracting the expected velocity from the current velocity, but does not reflect a situation in which it becomes a negative number which is less than 0.

In particular, the GainOFF may be for example, 1, or may be set to an appropriate value according to different interpretation or experimentation.

As a result, since the corrected engine-on reference value is basically decreased as compared to the basic engine-on reference value and the corrected engine-off reference value is increased as compared to the basic engine-off reference value, a width of a hysteresis section formed by setting the corrected engine-on reference value above power at an optimal efficiency operating reference point of the engine and setting the corrected engine-off reference value below the power at the optimal efficiency operating reference point of the engine is narrower than a hysteresis section formed by the basic engine-on reference value and the basic engine-off reference value, and the degree of narrowing the hysteresis section is appropriately varied according to the expected velocity, the current velocity, and the current SOC as described above.

As a result of the narrowed hysteresis section, it may reduce the time in which the engine is operated in an inefficient operating region by adjusting the width of the hysteresis section to a more appropriate level in consideration of the SOC of the hybrid vehicle together based on the current velocity of the vehicle and a prediction of a future behavior thereof, thereby making it possible to ultimately improve fuel efficiency of the vehicle.

Figure 5:
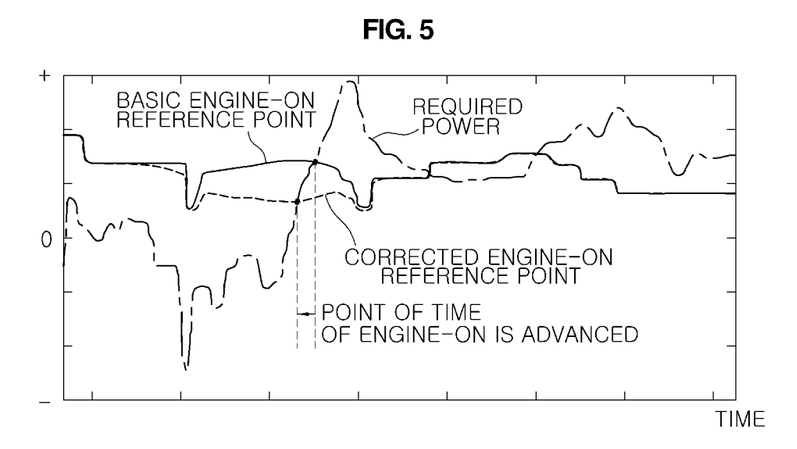
FIG. 5 is a view illustrating that a point of time at which an engine is turned on is advanced as a basic engine-on reference value is changed to a corrected engine-on reference value according to the present disclosure.

For example, FIG. 5 illustrates that a point of time at which the engine is turned on is advanced as the basic engine-on reference value is changed to the corrected engine-on reference value according to the present disclosure, and this means that the driving of the engine is already initiated before the required power of the driver reaches the basic engine-on reference value by immediately starting the engine when the required power of the driver exceeds power at the optimal efficiency operating reference point of the engine and then reaches the corrected engine-on reference value.

As such, an object of implementing hysteresis to exclude frequent turn on/off of the engine may be achieved even if the engine is started before the required power of the driver reaches the basic engine-on reference value. In particular, because the corrected engine-on reference value is determined in consideration of the expected velocity, the current velocity, and the current SOC, there is little concern that the vehicle will immediately turn off the engine since the vehicle is basically predicted to remain in an accelerated state for a predetermined time, and the degree of predicted result is already reflected to the corrected engine-on reference value. That is, as the vehicle continues to accelerate and there is little concern that the vehicle will turn off the engine, the corrected engine-on reference value is decreased to be closer to the power at the optimal efficiency operating reference point of the engine.

Further, according to the start on/off of the engine based on the prediction of the expected velocity of the vehicle as described above, when the vehicle is about to accelerate, the corrected engine-on reference value is decreased according to the degree of acceleration and closer to the power at the optimal efficiency operating reference point of the engine and when the vehicle is about to decelerate, the corrected engine-off reference value is increased according to the degree of deceleration and closer to the power at the optimal efficiency operating reference point of the engine, so that as compared to the case of using the basic engine-on reference value or the basic engine-off reference value, the start on of the engine is first performed when the vehicle is about to accelerate and the start off of the engine is first performed when the vehicle is about to decelerate, thereby improving acceleration and deceleration responsiveness of the vehicle.

Meanwhile, it is also possible to change the expected velocity to the concept of expected power or expected energy of the vehicle in the present disclosure, and the point of time of a start on/off control of the engine may be additionally and appropriately corrected in consideration of delay factors of the start on/off of the engine from the point of time at which the required power of the driver substantially reaches the corrected engine-on reference value or the corrected engine-off reference value.

As described above, according to the present disclosure, it is possible to improve fuel efficiency of the hybrid vehicle and increase acceleration/deceleration responsiveness of the vehicle according to a demand of a driver by more appropriately selecting the point of time at which the engine is turned on/off in the hybrid vehicle in response to a driving situation of the vehicle, and controlling the driving of the engine and the motor accordingly.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A driving control method for a hybrid vehicle, the driving control method comprising:
    an expected velocity calculation step of calculating, by a controller, an expected velocity of a corresponding vehicle based on a driver average vehicle velocity, which is an average vehicle velocity of a vehicle which is being driven and a road average vehicle velocity, which is an average vehicle velocity of a road on which the vehicle is being driven;
    a driving situation determination step of determining, by the controller, whether or not the vehicle is in a transition driving situation or a steady driving situation based on a current velocity of the vehicle and the expected velocity;
    a reference value correction step of correcting, by the controller, a basic engine-on reference value which is set to turn on an engine and a basic engine-off reference value which is set to turn off the engine according to a required power of a driver to a corrected engine-on reference value and a corrected engine-off reference value in consideration of the expected velocity and the current velocity, respectively, when it is determined that the vehicle is in the steady driving situation as a result of performing the driving situation determination step; and
    an engine-on/off step of turning on, by the controller, the engine when the required power of the driver is increased and reaches the corrected engine-on reference value during driving of the vehicle and turning off, by the controller, the engine when the required power of the driver is decreased and reaches the corrected engine-off reference value during the driving of the vehicle,
    wherein in the reference value correction step, the basic engine-on reference value is determined from a map according to the current velocity of the corresponding vehicle and a state of charge (SOC) of a battery, and the corrected engine-on reference value is determined by an equation:

Corrected Engine-On Reference Value=Basic Engine-On Reference Value−(Expected Velocity Current Velocity)*FactorON, where FactorON=MIN[Current SOC Reference SOC], Upper Limit SOC] *Current Velocity*MAX[(Expected Velocity−Current Velocity), 0]*GainON.

2. The driving control method of claim 1, wherein in the expected velocity calculation step, the driver average vehicle velocity is calculated by dividing a value obtained by adding vehicle velocities in all steps before a predetermined reference step number from a current control step of the controller by the reference step number;
    the road average vehicle velocity, which is the average vehicle velocity of the road on which the vehicle is being driven, is obtained from a navigation of the corresponding vehicle; and
    the expected velocity is calculated by adding a value obtained by multiplying a first correction factor by a difference between the road average vehicle velocity and the driver average vehicle velocity to the driver average vehicle velocity.

3. The driving control method of claim 1, wherein in the driving situation determination step, when a state in which a difference between the expected velocity and the current velocity is a predetermined reference vehicle velocity or less is maintained for a predetermined maintenance time or more, it is determined that the corresponding vehicle is in the steady driving situation, and otherwise, it is determined that the vehicle is in the transition driving situation.

4. The driving control method of claim 1, wherein in the reference value correction step, the basic engine-off reference value is determined from a map according to the current velocity of the corresponding vehicle and a state of charge (SOC) of a battery, and
    the corrected engine-off reference value is determined by an equation:

Corrected Engine-Off Reference Value=Basic Engine-Off Reference Value+(Current Velocity− Expected Velocity)*FactorOFF, where FactorOFF=MIN[Current SOC−Reference SOC], Upper Limit SOC] *Current Velocity*MAX[(Current Velocity−Expected Velocity), 0] *GainOFF.

5. The driving control method of claim 1, wherein in the reference value correction step, when the expected velocity is greater than the current velocity, the basic engine-on reference value is corrected to the corrected engine-on reference value.

6. The driving control method of claim 1, wherein in the reference value correction step, when the current velocity is greater than the expected velocity, the basic engine-off reference value is corrected to the corrected engine-off reference value.

7. A non-transitory computer readable medium containing program instructions executed by a processor, the computer readable medium comprising:
    program instructions that calculate an expected velocity of a corresponding vehicle based on a driver average vehicle velocity, which is an average vehicle velocity of a vehicle which is being driven and a road average vehicle velocity, which is an average vehicle velocity of a road on which the vehicle is being driven;
    program instructions that determine whether or not the vehicle is in a transition driving situation or a steady driving situation based on a current velocity of the vehicle and the expected velocity;

program instructions that correct a basic engine-on reference value which is set to turn on an engine and a basic engine-off reference value which is set to turn off the engine according to a required power of a driver to a corrected engine-on reference value and a corrected engine-off reference value in consideration of the expected velocity and the current velocity, respectively, when it is determined that the vehicle is in the steady driving situation as a result of performing the driving situation determination step; and program instructions that turn on the engine when the required power of the driver is increased and reaches the corrected engine-on reference value during driving of the vehicle and turn off the engine when the required power of the driver is decreased and reaches the corrected engine-off reference value during the driving of the vehicle, wherein the basic engine-on reference value is determined from a map according to the current velocity of the corresponding vehicle and a state of charge (SOC) of a battery, and the corrected engine-on reference value is determined by an equation:

Corrected Engine-On Reference Value=Basic Engine-On Reference Value−(Expected Velocity−Current Velocity)*FactorON, where FactorON=MIN[Current SOC−Reference SOC], Upper Limit SOC]*Current Velocity*MAX[(Expected Velocity−Current Velocity), 0]*GainON.

* * * * *